United States Patent
Wiesner et al.

(10) Patent No.: US 11,261,967 B2
(45) Date of Patent: Mar. 1, 2022

(54) DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

(71) Applicant: ZF Friedrichshafen AG, Friedrichshafen (DE)

(72) Inventors: Maik Wiesner, Weingarten (DE); Florian Weinl, Bodolz (DE); Dirk Leutheuser, Langenargen (DE); Thomas Schwegler, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/111,803

(22) Filed: Dec. 4, 2020

(65) Prior Publication Data
US 2021/0172520 A1 Jun. 10, 2021

(30) Foreign Application Priority Data
Dec. 5, 2019 (DE) ...................... 10 2019 218 985.7

(51) Int. Cl.
*F16H 63/34* (2006.01)
(52) U.S. Cl.
CPC ..... *F16H 63/3433* (2013.01); *F16H 63/3475* (2013.01); *F16H 63/3483* (2013.01)
(58) Field of Classification Search
CPC ............. F16H 63/3433; F16H 63/3483; F16H 63/3475; F16H 63/3425; B60T 1/005
See application file for complete search history.

(56) References Cited

U.S. PATENT DOCUMENTS 8,053,691 B2 11/2011 Vernacchia et al.
9,062,766 B2 6/2015 Mayr

FOREIGN PATENT DOCUMENTS

DE 102008062541 A1 8/2009
DE 102013213678 A1 1/2015
(Continued)

OTHER PUBLICATIONS

Machine language translation of DE102015214287.*
German Search Report DE 10 2019 218 985.7, dated Feb. 3, 2020. (10 pages).

*Primary Examiner* — Mark A Manley
(74) *Attorney, Agent, or Firm* — Dority & Manning, P.A.

(57) ABSTRACT

A device for locking a piston rod of a piston includes a latching mechanism actuatable by an actuating element. The actuating element is fixedly arranged on an armature rod of an electromagnet, is clamped between two preloading springs, and includes two actuating contours. Components of the device are configured with respect to geometry and with respect to forces acting upon each of the components such that a permanent magnet holds the armature rod in a first position in the non-energized condition of an electromagnet and in the engaged condition of the parking lock and such that the electromagnet holds the armature rod in a second position in the energized condition and in the disengaged condition of the parking lock. The parking lock is disengageable in the pressurized condition of the piston and in the energized condition of the electromagnet, and the parking lock is engageable in the non-pressurized condition of the piston and in the non-energized condition of the electromagnet.

11 Claims, 9 Drawing Sheets

(56) References Cited

FOREIGN PATENT DOCUMENTS

| DE | 102015214287 | * | 2/2017 |
| DE | 102015214287 A1 | | 2/2017 |
| DE | 102016221477 A1 | | 5/2018 |
| EP | 1960701 B1 | | 6/2009 |
| WO | WO 2018/082949 | | 5/2018 |

* cited by examiner

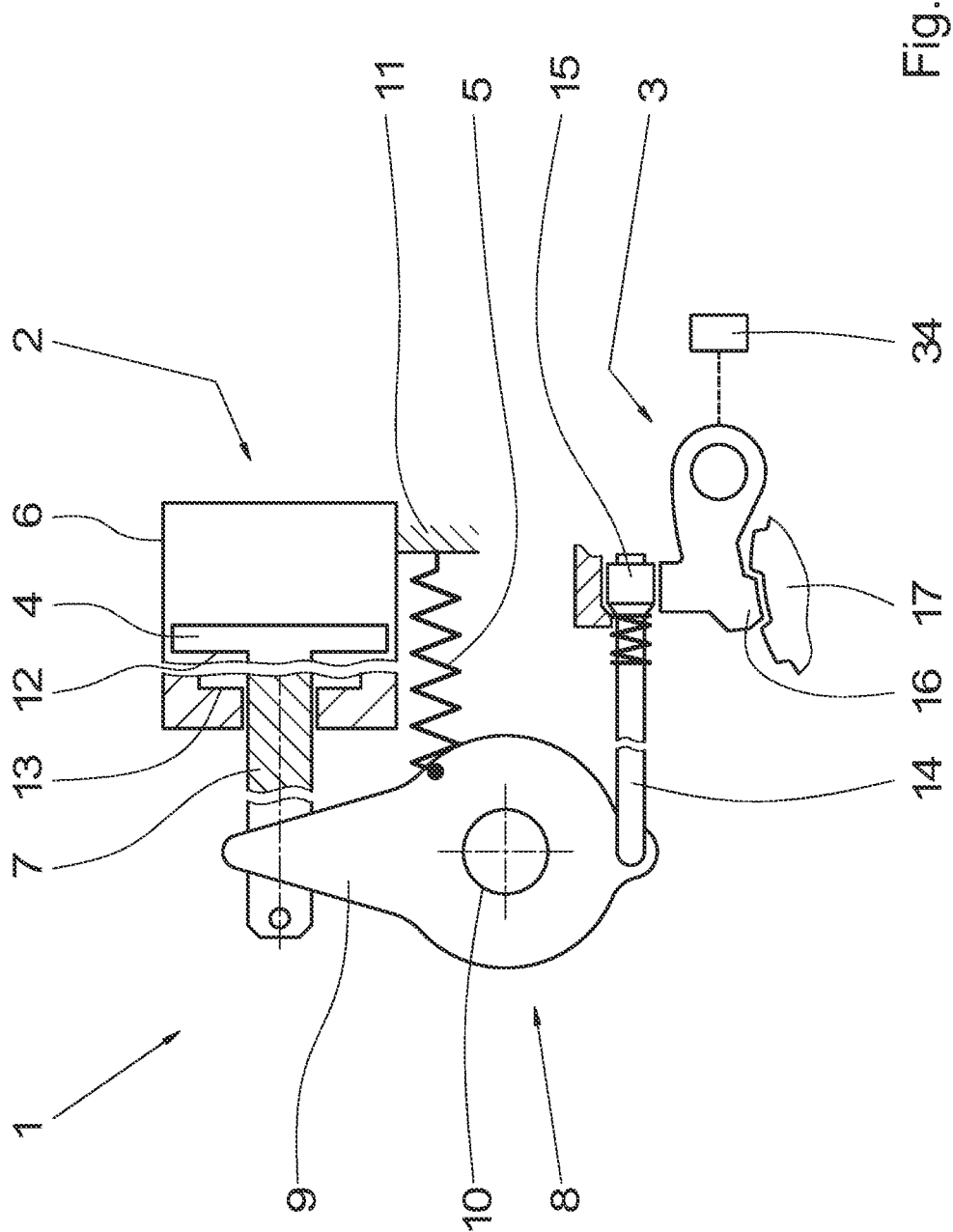

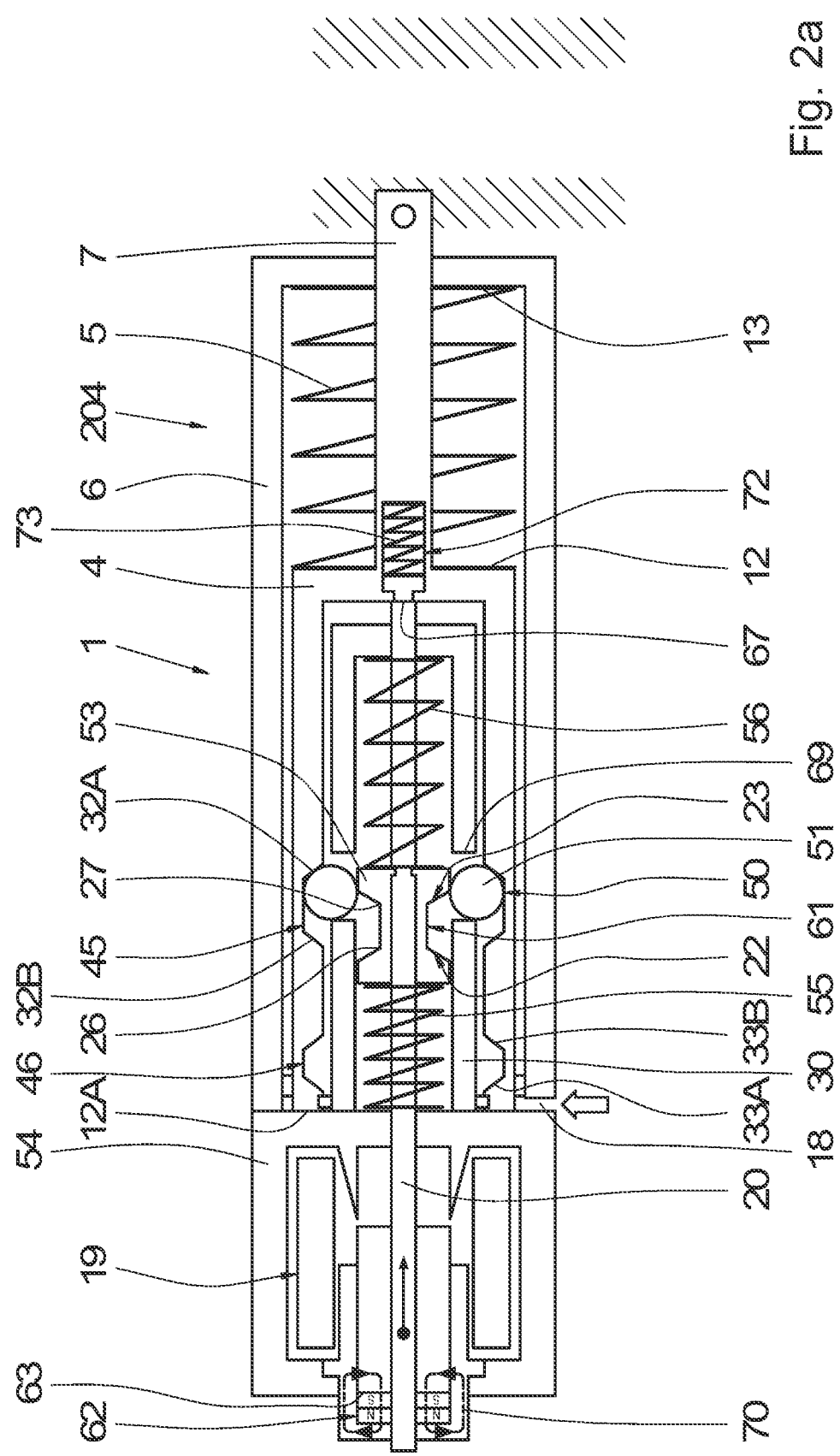

DEVICE FOR LOCKING A PISTON ROD OF A PISTON OF AN ACTUATOR WHICH IS PRESSURIZABLE IN ORDER TO DISENGAGE A PARKING LOCK AND IS SPRING-LOADED IN ORDER TO ENGAGE THE PARKING LOCK

CROSS-REFERENCE TO RELATED APPLICATION

The present application is related and has right of priority to German Patent Application No. 10 2019 218 985.7 filed on Dec. 5, 2019, which is incorporated by reference in its entirety for all purposes.

FIELD OF THE INVENTION

The invention relates generally to a device for locking a piston rod of a piston of an actuator, which is pressurizable in order to disengage a parking lock and is spring-loaded in order to engage the parking lock.

BACKGROUND

In practical applications, devices including actuators, which are provided for actuating units, are utilized in many areas. For this purpose, the actuators can each be transferred at least into two different operating conditions. Moreover, as is known, the actuators can also be locked and/or held in the operating conditions with the aid of locking units. In order to avoid an undesirable exit of the operating conditions of the actuators, the locking units can be interlocked, with the aid of electrically actuatable interlocking units, in a condition locking the actuator as well as in a condition releasing the actuator.

Known passenger car automatic transmissions/automatic transmissions often include a parking lock system, with the aid of which a drive train of a vehicle can be fixed or released, as demanded. A parking lock of a parking lock system of this type is usually hydraulically disengaged and is engaged with the aid of a spring accumulator. In order to be able to hold a parking lock of this type in defined positions, a parking lock system of this type includes a locking mechanism. A locking mechanism of this type offers the possibility of holding a parking lock in the demanded operating condition with little input of power and of avoiding safety-critical operating conditions. Moreover, a desired redundancy can be implemented and a vehicle availability can be ensured with the aid of a locking mechanism of this type.

With respect to the locking and release of an actuator provided for actuating a parking lock, a multitude of various mechanisms, which provide a positive engagement for the purpose of locking, is known from practical experience. The positive engagement is implemented, for example, with the aid of ball stops, detent hooks, pins, and the like. Spring units and/or electromagnets are also often utilized for actuating the locking and release.

In a multitude of parking lock systems, the parking lock is disengaged in the hydraulically pressurized condition of a non-interlocked piston, which is spring-loaded in the engagement direction of the parking lock. In the non-pressurized condition of the piston, the parking lock is engaged, when the piston is not interlocked, with the aid of the spring unit resting against the parking lock.

In one further known parking lock system, in the energized condition of an electromagnet, the actuator is locked with the aid of a detent hook exclusively in the disengaged condition of the parking lock. It is additionally provided in this case that the piston is appropriately hydraulically actuated in the direction of the disengaged operation condition of the parking lock and against the spring force of a spring unit active at the piston in the direction of the engaged operating condition of the parking lock. If the supply voltage of the electromagnet fails in the disengaged condition of the parking lock, the parking lock undesirably transitions into the engaged operating condition when the piston is in the non-pressurized condition. Moreover, the parking lock is disengaged when the piston is pressurized in the event of a fault.

Therefore, this parking lock system includes no redundant mechanical protection for a remote start of a vehicle, during which a vehicle is started by a driver with the aid of a remote ignition key or with the aid of a radio remote control, without the driver being located in the vehicle. Thereupon, in the event of a fault, the driver cannot secure the started vehicle against rolling away by actuating the service brake. Therefore, the redundant protection against an undesirable engagement or disengagement of the parking lock is provided in the area of the hydraulic system, which, however, is structurally complex and generates high production costs.

Moreover, a parking lock system is known, in which the actuator is locked in the disengaged operating condition of the parking lock and in the energized condition of the electromagnet. In the event of a loss of the supply voltage, the disengaged parking lock transitions into the engaged operating condition due to a spring unit active at the non-pressurized piston in the direction of the engaged condition. In the engaged operating condition of the parking lock, the actuator is not locked. Therefore, a redundant mechanical protection against an undesirable disengagement of the parking lock—which, in the event of a fault, is caused by an undesirable pressurization of the piston—is not possible during a remote start. In this parking lock system, the redundancy is to be provided in the area of the hydraulics, which, however, is complex and generates high production costs.

Additionally, one further parking lock system is known, in which the actuator or the parking lock actuator is locked exclusively in the engaged condition of the parking lock when an electromagnet is in the energized condition. In the disengaged condition of the parking lock, no locking of the actuator is provided. In order to avoid an undesirable actuation of the parking lock, a permanent pressurization of the piston of the actuator is necessary in the disengaged condition of the parking lock. During a remote start, the electromagnet is to be energized in the engaged condition of the parking lock. The voltage necessary therefor is often not available during a remote start.

Some of the above-described parking lock systems can lock the actuator of a parking lock system in a non-energized condition, which is favorable with respect to energy, but, in the case of a voltage loss in the area of an automatic transmission, do not have the possibility to engage the parking lock in the non-energized condition of the electromagnet and, thereupon, lock the actuator. This means, the parking lock either unintentionally remains in the disengaged condition or transitions into the engaged condition, in which, however, the parking lock cannot be locked.

The actuator of one further parking lock system is locked in the engaged operating condition as well as in the disengaged operating condition of the parking lock in the non-energized condition of an electromagnet of an interlocking unit. This means, the actuator is released via an appropriate energization of a coil of the electromagnet, in order to be able to engage or disengage the parking lock. In the case of a failure of the supply voltage, the parking lock remains in a present operating condition due to the locked condition of the actuator. Therefore, the engaged parking lock can be disengaged only by appropriately energizing the interlocking unit, whereby a vehicle cannot be towed in the event of a fault, for example. In addition, in the case of a failure of a power supply or in the case of a loss of the supply voltage of the parking lock system, the parking lock cannot be engaged and, therefore, a vehicle cannot be secured against rolling away, which is undesirable and possibly also critical to safety.

An inversion of the latter-described logic results in a parking lock system, in which the parking lock or the associated actuator, energized in the disengaged condition of the parking lock, can be locked. These types of parking lock systems are not remote start-capable, however, since their actuators can be locked only in the energized condition of the electromagnet when the parking lock is in the engaged condition. It is to be assumed, however, that the supply voltage of the electromagnet collapses during a remote start and an energization of the locking mechanism cannot be ensured. In order to nevertheless be able to actuate the parking lock to the desired extent, complex technical measures are to be provided in the area of the hydraulic supply of the actuator.

SUMMARY OF THE INVENTION

Example aspects of the present invention provide an improved device for locking a piston rod of a piston of an actuator, which is pressurizable in order to disengage a parking lock and is spring-loaded in order to engage the parking lock.

The device according to example aspects of the invention for locking a piston rod of a piston of an actuator, which can be pressurized in order to disengage a parking lock, includes a latching mechanism. Interlocking elements of the latching mechanism are accommodated in an axially fixed manner in a housing-affixed component and are radially movable. Moreover, an actuating element is provided for actuating the latching mechanism, which is fixedly arranged on an axially displaceable armature rod of an electromagnet. The actuating element is clamped between two preloading springs resting against the housing and includes two actuating contours, which face each other. The interlocking elements are radially displaced by the actuating contours upon actuation of the latching mechanism.

Moreover, the device according to example aspects of the invention includes a permanent magnet, with the aid of which the armature rod is holdable in a first position in the non-energized condition of the electromagnet. In the first position of the armature rod, one of the actuating contours of the actuating element fixes the interlocking elements of the latching mechanism in a first groove of the piston, which is associated with the engaged condition of the parking lock. In addition, in the energized condition of the electromagnet, the armature rod is transferable out of the first position into a second position, in which the other actuating contour of the actuating element fixes the interlocking elements of the latching mechanism in a second groove of the piston, which is associated with the disengaged condition of the parking lock.

The armature rod can be transferred into an intermediate position of the armature rod, which is located axially between the first position and the second position. In the intermediate position of the armature rod, the interlocking elements of the latching mechanism are guided radially out of the engagement with the first groove or with the second groove of the piston into a section of the actuating element, which is located axially between the two actuating contours. Thereupon, the latching is released.

In the first position of the armature rod, the actuating element is acted upon by a force directed in the direction of the second position of the armature rod and, in the second position of the armature rod, is acted upon by a force directed in the direction of the first position of the armature rod. In the intermediate position, the armature rod is in a force-compensated condition.

The components of the device according to example aspects of the invention are coordinated with each other with regard to their geometry and with regard to the forces acting upon each component. The components are coordinated with each other in such a way that the permanent magnet holds the armature rod in the first position in the non-energized condition of the electromagnet and in the engaged condition of the parking lock. Moreover, the coordination is such that the electromagnet holds the armature rod in the second position in the energized condition and in the disengaged condition of the parking lock, and the parking lock is disengageable in the pressurized condition of the piston and in the energized condition of the electromagnet. In addition, the coordination is such that the parking lock is engageable in the non-pressurized condition of the piston and in the non-energized condition of the electromagnet.

In the case of an embodiment of the device according to example aspects of the invention, which can be operated with little input of power, the components are coordinated with each other with respect to geometry and with respect to the forces acting upon each of the components in such a way that the permanent magnet holds the armature rod in the first position in the non-energized condition of the electromagnet and in the engaged condition of the parking lock, in the non-pressurized condition as well as in the pressurized condition of the piston.

In the case of an embodiment of the device according to example aspects of the invention, which can be operated with little outlay for open-loop and closed-loop control, the components are coordinated with each other with respect to geometry and with respect to the forces acting upon each of the components in such a way that the electromagnet holds the armature rod in the second position in the energized condition and in the disengaged condition of the parking lock, in the non-pressurized condition of the piston.

The latching mechanism is centrally arranged within the piston in the case of a device requiring little installation space in the axial direction.

The components can be coordinated with each other with respect to geometry and with respect to the forces acting upon each of the components in such a way that the armature rod is transferable out of the first position into the intermediate position in the pressurized condition of the piston and in the energized condition of the electromagnet. It can be provided that the latching is releasable in the intermediate position of the armature rod. Additionally, it is possible, in the released condition of the latching mechanism, that the piston rod is transferable by the pressure applied at the piston in the direction of the end position associated with the disengaged condition of the parking lock and the armature rod is transferable into the second position by the energized electromagnet. Thereupon, the parking lock transitions out of the engaged condition into the disengaged condition with little outlay for open-loop and closed-loop control.

Additionally, the components can be coordinated with each other with respect to geometry and with respect to the forces acting upon each of the components in such a way that the armature rod is transferable into the intermediate position starting from the disengaged condition of the parking lock and in the non-pressurized condition of the piston and in the non-energized condition of the electromagnet due to a preload force applied at the actuating element in the second position of the armature rod, and the latching transitions into the released condition. The piston rod can then be transferred into a position associated with the engaged condition of the parking lock as a result of a spring force of a spring unit. The armature rod transitions into the first position, in which the permanent magnet holds the armature rod.

The grooves of the piston are designed as radial inner grooves in an installation space-favorable example embodiment.

In a structurally simple refinement of the device according to example aspects of the invention, the latching mechanism is designed as a ball stop, which includes balls as interlocking elements.

It can be provided that the ball stop is centrally arranged within the piston. Balls of the ball stop can be accommodated in an axially fixed manner in the component designed as a housing-affixed sleeve. Additionally, it is then possible that the balls of the ball stop are radially displaceable with respect to the sleeve and can be brought into engagement or out of the engagement with the piston by way of rolling at the particular associated actuating contour.

The interlocking elements of the latching mechanism can also be designed as spring arms, whose first ends are fixed on the housing side and whose second ends can each be swiveled with respect to the first ends by way of the actuating contours and, as a result, can be brought into engagement with the piston in a form-locking manner or out of the engagement with the piston. These types of spring arms are known, for example, from EP 1 960 701 B1.

An operating condition of the device according to example aspects of the invention can be determined in a simple way when a sensor for determining an axial actuating travel of the armature rod is provided.

It is possible that the sensor is designed as a Hall sensor, via which an actuating movement of the actuating element can be sensed. Additionally, in the example embodiment of an electromagnetically actuatable locking mechanism, the operating condition of the interlocking unit can also be indirectly sensed.

The device according to example aspects of the invention can include a two-position controller for operating the electromagnet, and a determination means. With the aid of the determination means, a time profile of a control signal output by the two-position controller at the electromagnet is determinable. Depending thereon, a particular currently present axial position of the armature rod is determinable. Depending thereon, in turn, a particular operating condition of the ball stops is establishable.

A two-position controller of this type is known, for example, from DE 10 2016 221 477 A1, which is part of a device for operating and for determining an operating condition of an electromagnetic actuator. The known device includes a determination means in addition to the two-position controller for operating the actuator. The determination means is designed for determining a time profile of a control signal output by the two-position controller and, on the basis thereof, determining the operating condition. In particular, a dynamic of the control signal is determined for this purpose. The known device is designed for supplying an electric current and/or actuator current to the actuator on the basis of the control signal. A characteristic time profile of the actuator current forms according to the time profile of the control signal. The operating condition of the actuator is inherently contained therein, because the operating condition essentially determines the speed at which the actuator current increases and then decreases, as well as the maximum and average level of the actuator current. Finally, the operating condition of the actuator can be determined under consideration of the control signal of the two-position controller.

This knowledge can be utilized in a simple way during the operation of the device according to example aspects of the invention for determining the locking condition of the piston and of the parking lock. With respect to the device according to example aspects of the invention, the electromagnet is energized in the disengaged condition of the parking lock, in order to lock the piston, prevent an axial movement of the piston, and avoid an undesirable engagement of the parking lock.

The implementation of the device according to example aspects of the invention in a parking lock system of an automatic transmission of a vehicle or of a vehicle including an electric motor offers the possibility, in a simple way, to overcome the disadvantages known from the prior art. Thereupon, the parking lock is locked in the disengaged condition and in the energized condition of the electromagnet and is locked in the engaged condition of the parking lock as well as in the non-energized condition of the electromagnet. Moreover, the parking lock is released in the engaged condition of the parking lock and in the energized condition of the electromagnet, and is released in the disengaged condition of the parking lock and in the non-energized condition of the electromagnet.

With the aid of this type of parking lock system, a remote start is possible even in the case of a loss of the supply voltage of the electromagnet or without voltage supply of the transmission, since the actuator is locked in the engaged condition of the parking lock and in the non-energized condition of the electromagnet.

Moreover, in the case of this type of parking lock system, the reliability is increased due to the fact that the actuator is unlocked or released in the disengaged condition of the parking lock and in the non-energized condition of the electromagnet. As a result, a transition out of the disengaged condition of the parking lock into the engaged condition of the parking lock is possible in the non-energized condition of the electromagnet. Thereafter, the actuator is held locked in the engaged condition of the parking lock.

One further advantage of a parking lock system of this type is that the locking of the actuator in the disengaged condition of the parking lock can be implemented by applying minimal current values. Additionally, the actuator can be unlocked in the engaged condition of the parking lock by energizing the electromagnet and the actuator can be released.

The invention is not limited to the specified combination of features of the independent claim or the claims dependent thereon. In addition, individual features can be combined with one another, provided they arise from the claims, the description of embodiments that follows, or directly from the drawing. References in the claims to the drawings via the use of reference signs is not intended to limit the scope of protection of the claims.

BRIEF DESCRIPTION OF THE DRAWINGS

Multiple exemplary embodiments of the invention are explained in greater detail with reference to the drawings, without being limited thereto.

Wherein:

FIG. 1 shows a highly schematicized partial representation of a parking lock system of an automatic transmission; and FIG. 2a to FIG. 2h show an enlarged view of a device for actuating a parking lock of the parking lock system according to FIG. 1 in various operating conditions.

DETAILED DESCRIPTION

Figure 2B:
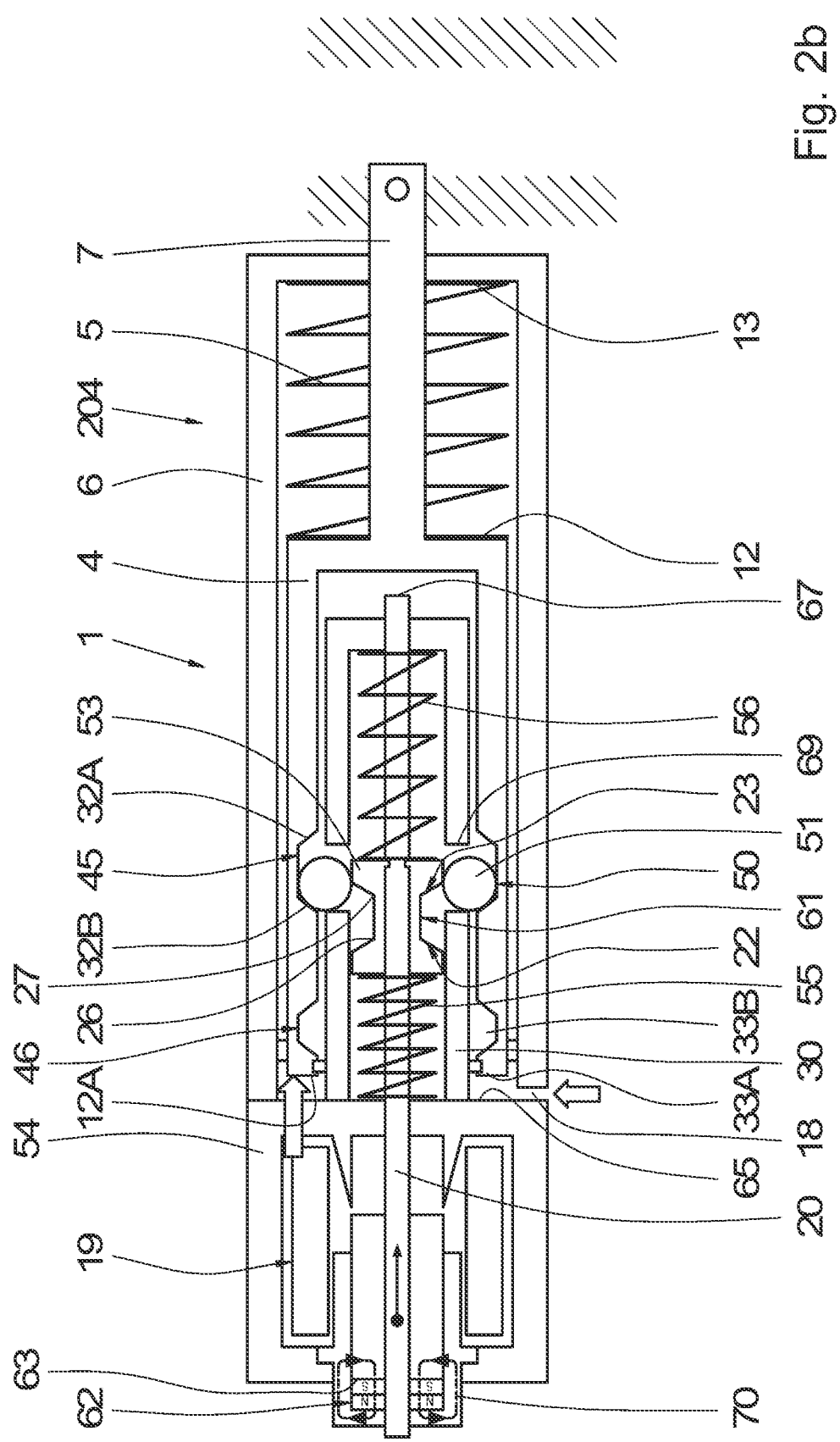
Figure 2C:
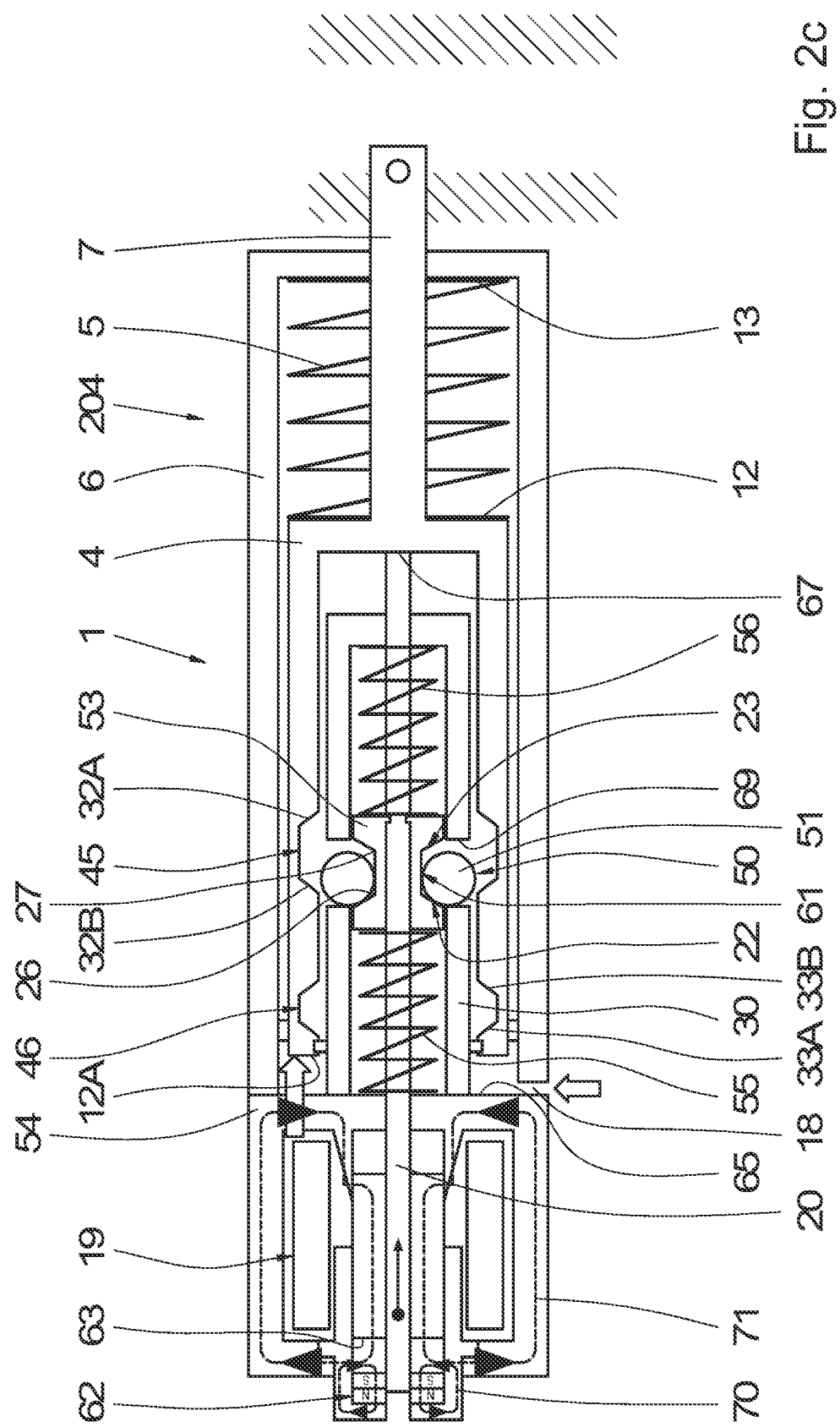

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A schematic partial longitudinal cutaway view of a parking lock system 1 known from practical experience, including a device 2 for actuating a parking lock 3, is represented in FIG. 1. The device 2 includes an actuator, which includes a piston 4, which can be acted upon by fluid. The piston 4 is actuatable in the opening direction or in the direction of a disengaged condition of the parking lock 3, depending on the particular applied fluid pressure, counter to a spring unit 5 acting in the closing direction or an engaged condition of the parking lock 3. For this purpose, the piston 4 is arranged, displaceably in the axial direction, in a cylinder 6 of the actuator. Additionally, the piston 4 is connected to a deflecting mechanism 8 via a piston rod 7. In the present case, the deflecting mechanism 8 includes a rotary disk 9, which is designed to be rotatable in the area of a pin 10. The spring unit 5 is designed as a compression spring in the present case and is connected at one end to the rotary disk 9. At the other end, the spring unit is supported in the area of a housing 11.

Moreover, the rotary disk 9 is operatively connected to a parking interlock rod 14, which is coupled to a parking interlock cone 15. The parking interlock cone 15 cooperates with a parking pawl 16. The parking pawl 16 is engagable, via an axial movement of the piston 4, with a parking interlock gear 17, which is rotationally fixed to an output shaft of a vehicle drive train, in order to rotationally fix the output shaft. If the parking pawl 16 is guided out of the engagement with the parking interlock gear 17 via an axial movement of the piston 4 in the opposite direction, the parking lock 3 is disengaged and the output shaft can rotate.

A device 204 represented in FIG. 2a through FIG. 2h for actuating the parking lock 3 has the same functionality as the device 2. Therefore, the same reference numbers are used in the description and in the drawing for structurally and functionally identical components of the devices 2 and 204.

With respect to the device 204, the spring unit 5 is arranged between an end face 12 of the piston 4 and an inner side 13 of the cylinder 6 facing the end face 12 of the piston 4. The spring unit 5 is designed as a compression spring in each case, in order to be able to engage the parking lock 3 in the non-pressurized condition of the piston 4.

The device 204 includes an actuator, which includes a piston 4, which is longitudinally displaceably arranged in a cylinder 6 of the actuator. In the operating condition of the device 204 represented in FIG. 2a, the piston 4 has an axial position, in which the parking lock 3 is engaged. In contrast, FIG. 2e shows the piston 4 in a second end position, in which the parking lock 3 is disengaged. In the operating condition of the device 204 shown in FIG. 2a as well as in the operating condition of the device 204 shown in FIG. 2e, the piston 4 is locked or held in an axially non-displaceable manner via a latching mechanism 50 of a locking unit, which is designed as a ball stop. Interlocking elements 51 of the ball stop 50, which are designed as balls, are accommodated in an axially fixed manner in a component 30 designed as a housing-affixed sleeve, wherein axial movements of the balls 51 with respect to the sleeve 30 are essentially not possible.

Moreover, the device 204 includes an actuating element 53 for actuating the ball stop 50, which is fixedly arranged on an axially displaceable armature rod 20 of an electromagnet 19 of an interlocking unit. The actuating element 53 is clamped between two preloading springs 55, 56, which, respectively, rest against the housing 54 or against the sleeve 30 fixedly connected thereto. Additionally, the actuating element 53 includes two actuating contours 22, 23, which face each other and whose base points 26, 27 essentially have the same outer diameter as a cylindrical intermediate area 61 of the actuating element 53, which is formed between the actuating contours 22 and 23. The balls 51 of the ball stop 50 are radially displaced with respect to the sleeve 30 by way of the actuating contours 22 and 23 of the actuating element 53 in the manner described in greater detail below, in order to latch the piston 4 or release an axial actuating movement of the piston 4 with respect to the cylinder 6.

In addition to the electromagnet 19, the device 204 includes a permanent magnet 62, with the aid of which, in the non-energized condition of the electromagnet 19, the armature rod 20 is holdable in the axial position shown in FIG. 2a. The armature rod 20 rests against the permanent magnet 62 in an essentially gapless manner via the end face 63 associated with the permanent magnet 62.

In the condition of the device 204 shown in FIG. 2a, the balls 51 of the ball stop 50 are radially held in a radial inner groove 45 of the piston 4 by the actuating contour 23 of the actuating element 53. The balls 51 are engaged with the piston 4 in a form-locking manner and lock the piston 4. Therefore, the radial inner groove 45 is associated with the engaged operating condition of the parking lock 3.

The piston 4 is hydraulically pressurizable in the area of an end face 12A via a hydraulic port 18. The hydraulic pressure acts against a spring force of a spring unit 5 active at the piston 4. In the operating condition of the device 204 represented in FIG. 2a, the hydraulic pressure applied at the piston 4 is such that the piston 4 is pressed by the spring unit 5 against a mechanical stop 65 of the housing 54. In this operating condition, the balls 51 of the ball stop 50 rest against a lateral face 32A of the radial inner groove 45. Additionally, in the non-pressurized condition of the piston 4 and in the engaged condition of the parking lock 3, the armature rod 20 rests against the piston 4 via an end 67, which faces away from the electromagnet 19, and, therefore, is additionally held by the piston 4 in a condition in which the piston 4 is locked If there is a demand to disengage the parking lock 3, initially the pressure applied at the piston 4 is increased via the hydraulic port 18. As a result, the piston 4 is transferred out of the axial position shown in FIG. 2a into the position shown in FIG. 2b, in which the balls 51 of the ball stop 50 come to rest against a further lateral surface 32B of the radial inner groove 45. If the piston 4 is further displaced in the direction of the spring unit 5, the balls 51 additionally come to rest against a surface 69 of the sleeve 30, and the piston 4 cannot be further displaced in the direction of the spring unit 5. Thereupon, a distance between the piston 4 and the end face or the end 67 of the armature rod 20 is such that the armature free travel necessary for actuating the actuating element 53 is available, in order to be able to release the piston 4.

The armature free travel, which is described in greater detail above, is implemented via an appropriate configuration of the axial distance between the two lateral surfaces 32A and 32B of the radial inner groove 45.

In one preferred example embodiment of the device 204, the axial overtravel of the piston 4 implemented in the area of the radial inner groove 45 is greater than or equal to one half (½) of the total axial actuating travel of the armature rod 20.

The electromagnet 19 is energized in order to be able to release the piston 4 in the position shown in FIG. 2b. The energization of the electromagnet 19 weakens the permanent-magnetically activated magnetic circuit 70 of the permanent magnet 62. The permanent magnet 62 and the electromagnet 19 are positioned with respect to each other in such a way that, in the energized condition of the electromagnet 19, the magnetic circuit 70 is influenced with respect to the reluctance effect at the armature rod 20 by way of a suitable partially common magnetic flux guidance with the electromagnetically activatable magnetic circuit 71. The influencing of the magnetic circuit 70 of the permanent magnet 62 by way of the electromagnetic magnetic circuit 71 is then such that the magnetic force of the permanent magnet 62 is reduced or weakened by the electromagnet 19.

In the energized condition of the electromagnet 19, the actuating element 53 is displaceable, together with the armature rod 20, in the direction of the piston 4 by the preloaded preloading spring 55 against the spring force of the further preloading spring 56 and counter to the weakened magnetic force of the permanent magnet 62. The armature rod 20 is displaced, in the present case, so far that the armature rod 20 rests against the piston 4 via the end 67 to the extent represented in FIG. 2c. Due to this axial actuating travel of the armature rod 20 and of the actuating element 53 with respect to the sleeve 30, the cylindrical intermediate area 61 of the actuating element 53 is located underneath the balls 51 of the ball stop 50. Thereupon, the balls 51 are guidable radially inward out of the engagement with the piston 4. Therefore, in the energized condition of the electromagnet 19 and in the engaged condition of the parking lock 3, the piston 4 is released and is displaceable in the axial direction, by the applied hydraulic pressure, against the spring unit 5, in order to disengage the parking lock 3.

Moreover, the magnetic circuit 70 of the permanent magnet 62 is weakened or reduced by the magnetic circuit 71 of the electromagnet 19 to such an extent that the actuating element 53 remains in the intermediate position necessary for the release of the piston 4 due to the equilibrium of forces setting in between the two preloading springs 55 and 56. In this case, the release current of the magnetic circuit 71 of the electromagnet 19, which is applied to the electromagnet 19 for the compensation of the magnetic circuit 70 of the permanent magnet 62, is less than the pull-in current of the magnetic circuit 71. The pull-in current is to be applied to the electromagnet 19 in order to be able to lock the piston 4 to the extent described further below, in the disengaged operating condition of the parking lock 3. It is therefore prevented, in a simple way, that the armature rod 20 does not transition, due to the applied holding current, into the second locking position, in which the piston 4 is locked in the disengaged condition of the parking lock 3.

Figure 2D:
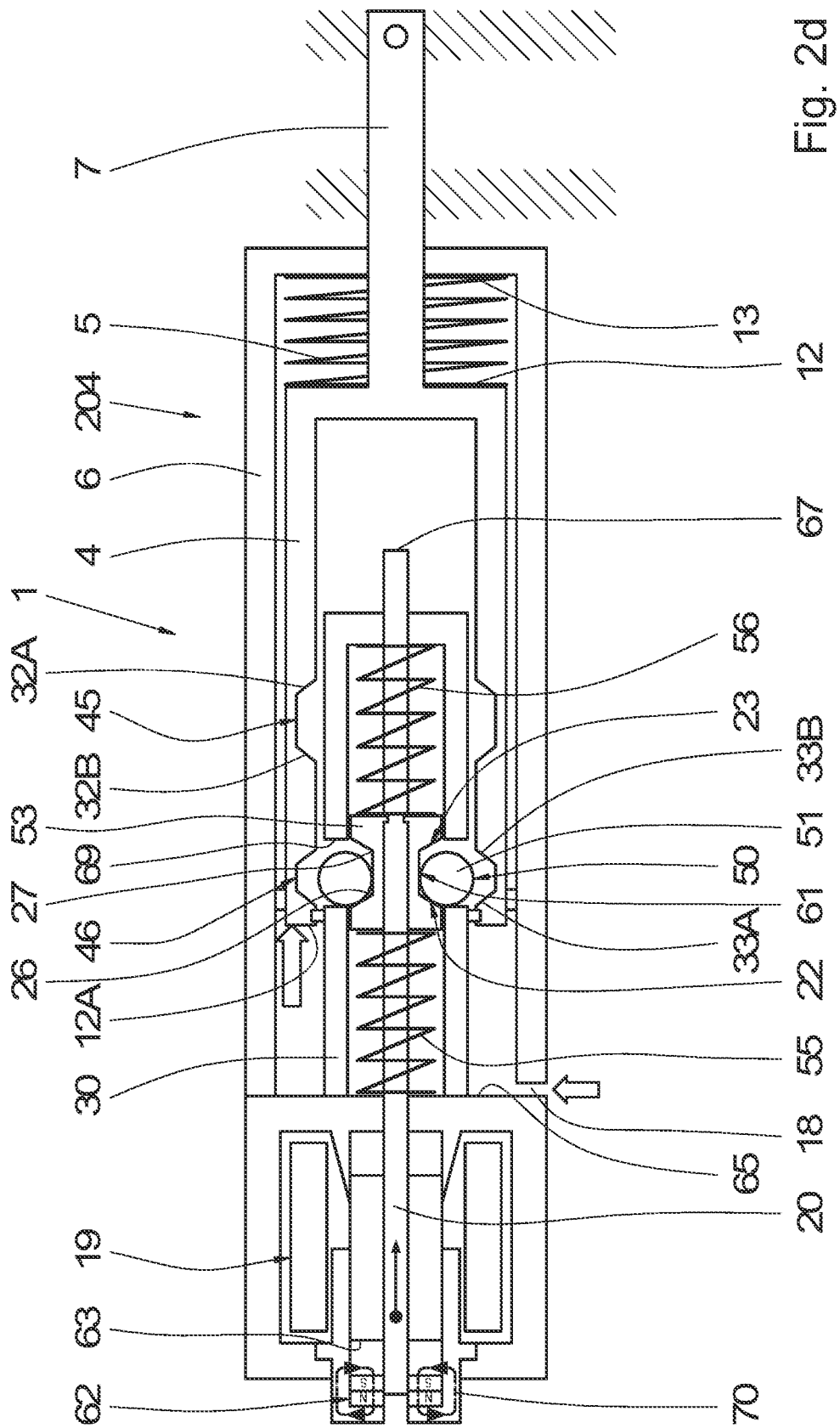
Figure 2E:
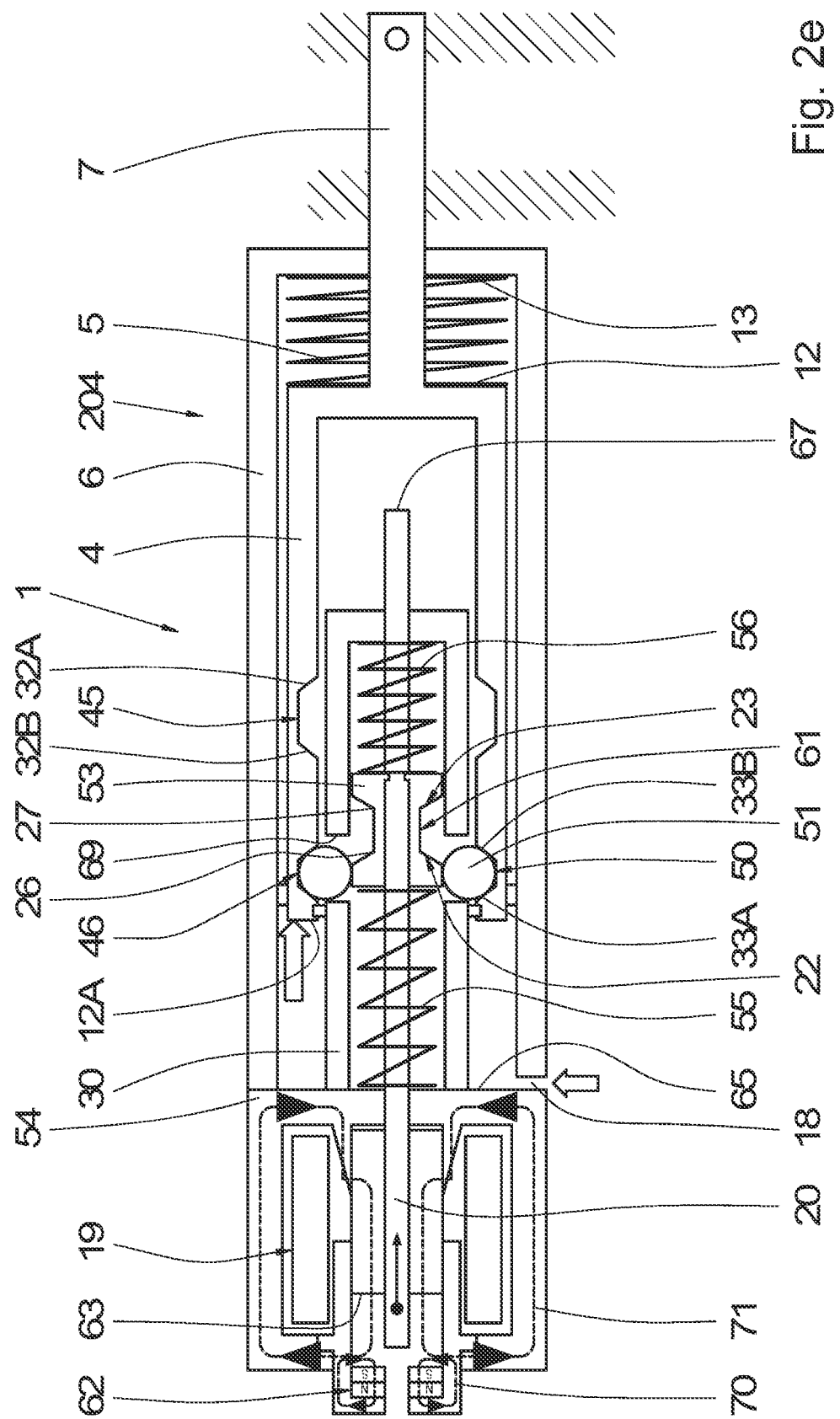
Figure 2F:
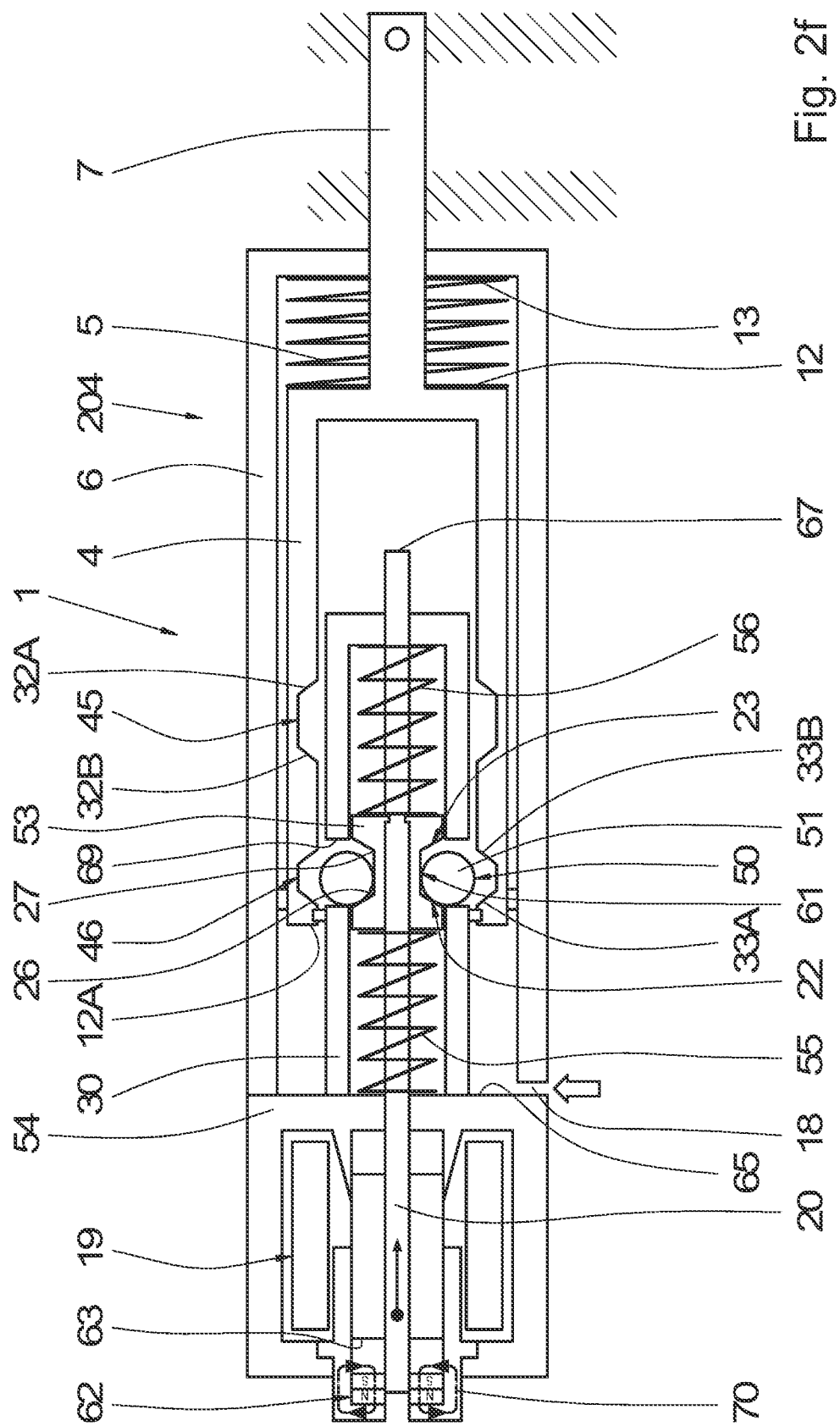
Figure 2G:
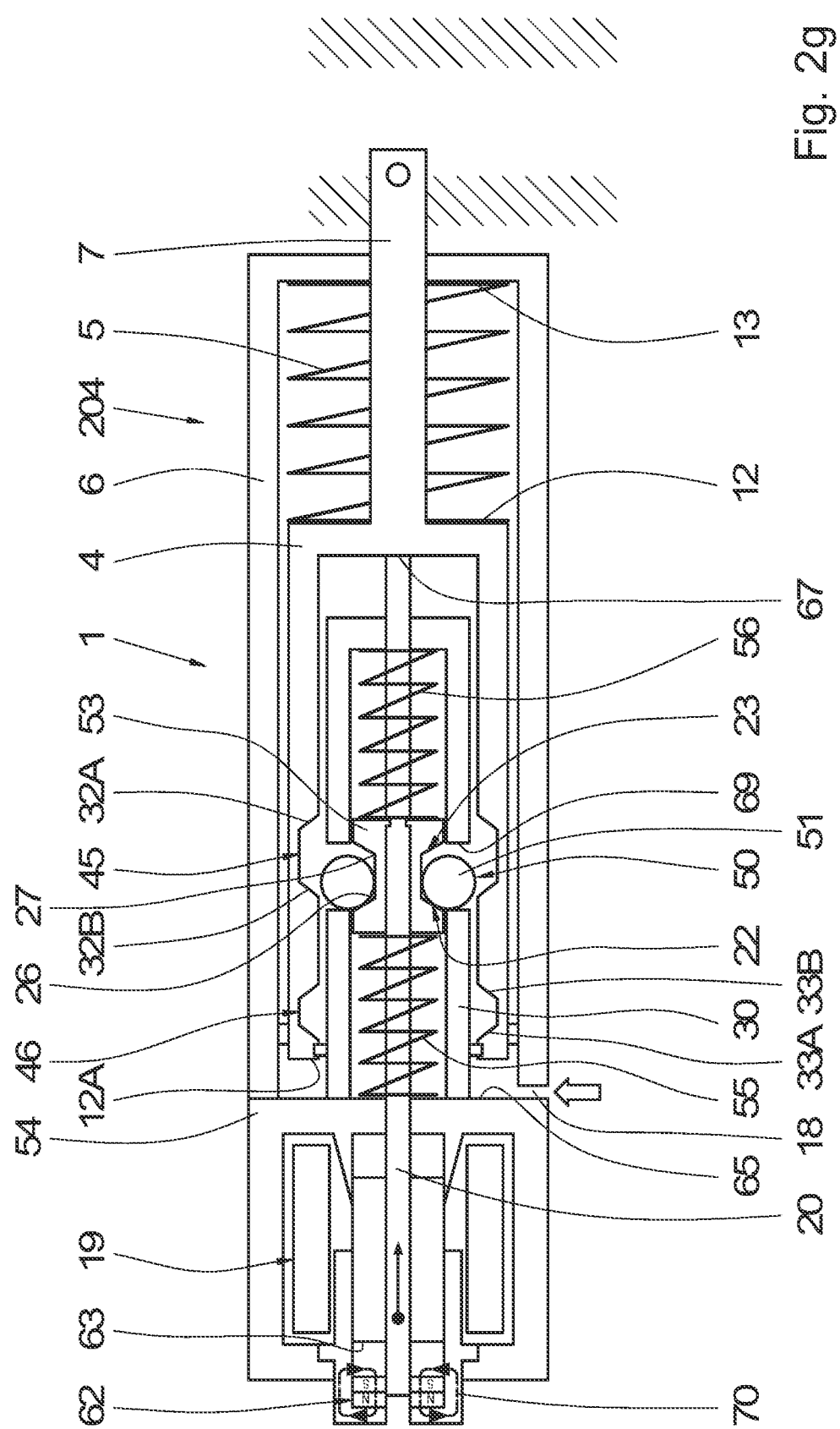
Figure 2H:
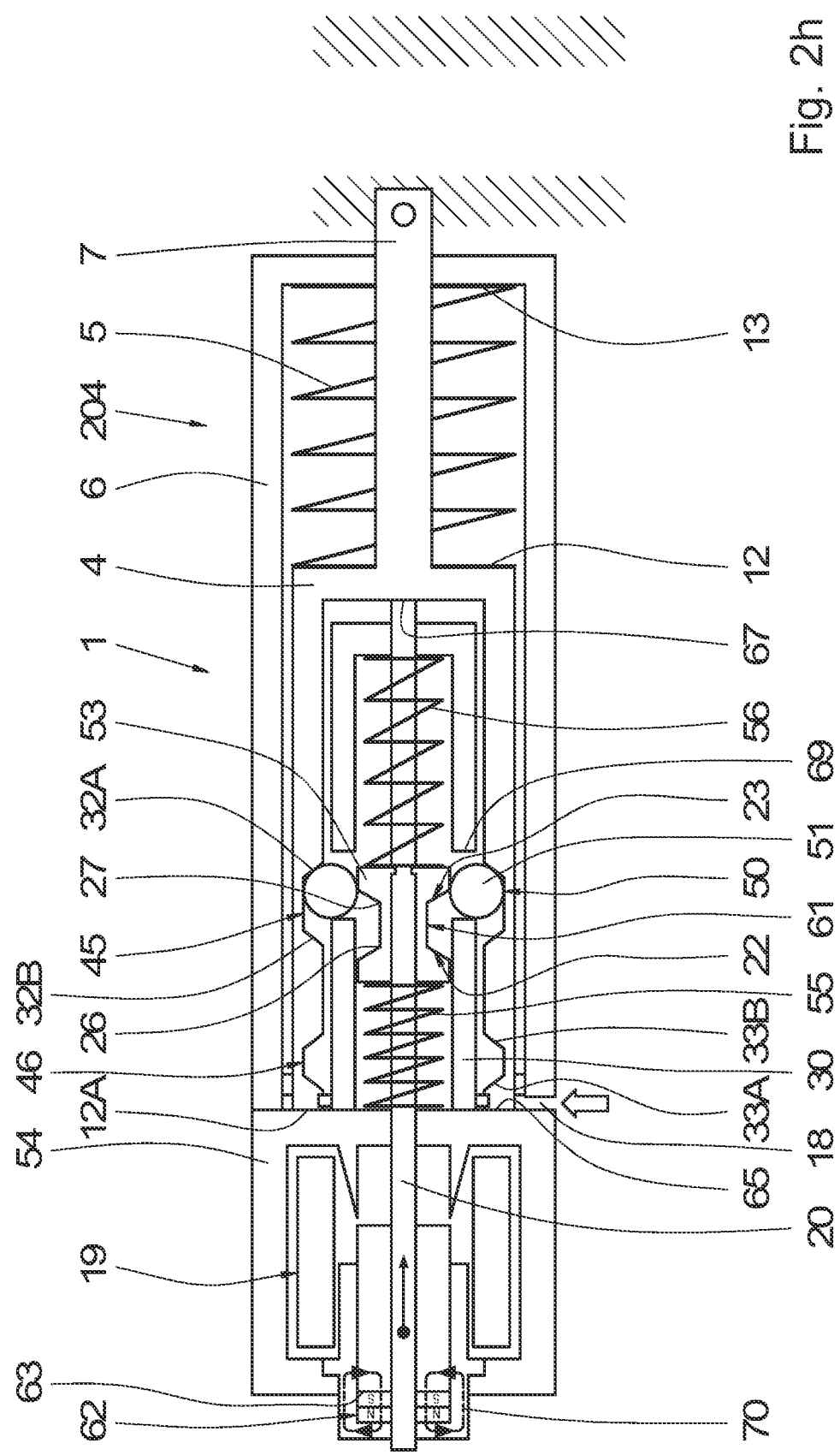

As soon as the piston 4 has reached the axial position shown in FIG. 2d, the parking lock 3 is disengaged. In this position of the piston 4, the balls 51 of the ball stop 50 are axially aligned with one further radial inner groove 46. In order to be able to lock the piston 4 in this axial position, via the ball stop 50, against an undesirable engagement of the parking lock 3, the pull-in current of the electromagnet 19 is appropriately adjusted. This causes the armature rod 20 to be axially displaced, against the spring force of the preloading spring 56, into the position represented in FIG. 2e, in which the balls 51 of the ball stop 50 are guided by the actuating contour 22 radially outward into the engagement of the radial inner groove 46 and lock the piston 4. In this end position of the armature rod 20, the pull-in current of the electromagnet 19 is reduceable to a holding current after the activation of the locking of the piston 4, whereby an amount of energy for locking the piston 4 in the disengaged condition of the parking lock 3 is low.

The radial inner grooves 45 and 46 are designed including the lateral surfaces 32A, 33A and 32B, 33B, which are pitched with respect to the radial direction. Via the beveled lateral surfaces 32A, 33A and 32B, 33B of the radial inner grooves 45, 46, an undesirable misalignment or jamming of the ball stop 51 is prevented in a simple way.

If there is a demand to engage the parking lock 3, the pressure applied at the piston 4 is reduced or switched off. Additionally, the energization of the electromagnet 19 is switched off. As a result, the actuating element 53 is displaced by the preloaded preloading spring 56 into the central position represented in FIG. 2f, in which the balls 51 of the ball stop 50 are axially in overlap with the cylindrical intermediate area 61 and are radially guidable out of the engagement with the piston 4 or the radial inner groove 46.

The stiffness constant of the preloading spring 56 is greater than the stiffness constant of the preloading spring 55. As a result, it is ensured that the armature rod 20 does not drop into the permanent-magnetic end position, in which the armature rod 20 rests against the permanent magnet 62 due to the inertia or a force additionally active at the armature rod 20 during the release under load. Simultaneously, the device 204 is tuned in such a way that the armature rod 20 is also not displaced by the permanent magnet 62 out of the central position into the permanent-magnetic end position according to FIG. 2a.

The locking of the piston 4 finally takes place, in the engaged condition of the parking lock 3, via the axial displacement of the piston 4 in the direction of the electromagnet 19. The piston 4 rests against the end 67 of the armature rod 20 at a defined axial actuating travel, in the manner shown in FIG. 2g. As a result, the armature rod 20 is displaced, together with the piston 4, by the spring unit 5 in the direction of the permanent magnet 62 until the piston 4 and the armature rod 20 reach the end positions represented in FIG. 2h. In this end position, the armature rod 20 is permanent-magnetically held by the magnetic circuit 70 of the permanent magnet 62 and the piston 4 is locked to the desired extent.

In order to limit the loads applied at the armature rod 20 when the armature rod 20 is in contact, via the end 67, with the piston 4, an optional tolerance compensation 72, which is shown in FIG. 2a and includes a spring unit 73, can be provided in the area of the piston 4. Axial loads active in the area of the armature rod 20, which can assume undesirably high values due to manufacturing tolerances, are limited in a structurally simple way with the aid of the spring 73.

The tolerance compensation 72 makes it possible for the armature rod 20 to plunge, via the end 67, into the piston 4 or into the piston rod 7. The coordination of the stiffness constant of the spring unit 73 with respect to the stiffness constants of the preloading springs 55 and 56 is such that the above-described actuation of the locking of the piston 4 is not influenced by the spring unit 73 and, simply, an overload protection of the device 204 is implemented.

Moreover, it is also possible to design the latching mechanism of the locking unit not to include the interlocking elements designed as balls, but rather including interlocking elements designed as spring arms. The spring arms are swivelably operatively connected to the cylinder 6 and preferably include a hook-like end. Interlocking elements of this type are known, for example, from EP 1 960 701 B1, which is incorporated by reference herein in its entirety, and are swivelable radially outward with the aid of the actuating contours 22 and 23, in order to prevent an actuating movement of the piston 4 or, in the swiveled-in condition, to release the piston 4.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking lock system
2 device
3 parking lock
4 piston
5 spring unit
6 cylinder
7 piston rod
8 deflecting mechanism
9 rotary disk
10 pin
11 housing
12 end face of the piston
12A further end face of the piston
13 inner side of the cylinder
14 parking interlock rod
15 parking interlock cone
16 parking pawl
17 parking interlock gear
18 hydraulic port
19 electromagnet
20 armature rod
22 actuating contour
23 actuating contour
26 base point of the actuating contour 22
27 base point of the actuating contour 23
30 component, sleeve
32A to 33B lateral surfaces of the radial inner grooves 45 and 46
34 sensor
45 radial inner groove
46 radial inner groove
50 latching mechanism, ball stop
51 interlocking element, ball of the ball stop 50
53 actuating element
54 housing
55 preloading spring
56 further preloading spring
61 cylindrical intermediate area of the actuating element
62 permanent magnet
63 end face of the armature rod
65 stop
67 end of the armature rod
69 surface of the sleeve
70 magnetic circuit of the permanent magnet
71 magnetic circuit of the electromagnet
72 tolerance compensation
73 spring unit
X axial distance of the base points

The invention claimed is:

1. A device (2; 204) for locking a piston rod (7) of a piston (4) of an actuator, which is pressurizable in order to disengage a parking lock (3), the device (2; 204) comprising:

a latching mechanism (50) with interlocking elements (51) accommodated in an axially fixed manner in a housing-affixed component (30), the interlocking elements (51) being radially movable;

an actuating element (53) configured for actuating the latching mechanism (50), the actuating element (53) fixedly arranged on an axially displaceable armature rod (20) of an electromagnet (19), the actuating element (53) clamped between two preloading springs (55, 56) resting against a housing (54), the actuating element (53) comprising two actuating contours (22, 23) that face each other and at which the interlocking elements (51) move and are radially displaced upon actuation of the latching mechanism (50); and a permanent magnet (62) configured such that the armature rod (20) is holdable in a first position when the electromagnet (19) is in a non-energized condition of the electromagnet (19), one of the actuating contours (23) of the actuating element (53) fixing the interlocking elements (51) of the latching mechanism (50) in a first groove (45) of the piston (4) in the first position, the parking lock (3) being in an engaged condition of the parking lock (3) when the armature rod (20) is in the first position of the armature rod (20), wherein the armature rod (20) is transferable out of the first position into a second position when the electromagnet (19) is in an energized condition of the electromagnet (19), the other of the actuating contours (22) of the actuating element (53) fixing the interlocking elements (51) of the latching mechanism (50) in a second groove (46) of the piston (4) in the second position, the parking lock (3) being in a disengaged condition of the parking lock (3) when the armature rod (20) is in the second position of the armature rod (20), wherein the armature rod (20) is transferable into an intermediate position of the armature rod (20) situated axially between the first position and the second position, the interlocking elements (51) of the latching mechanism (50) positioned radially out of the first groove (45) and the second groove (46) of the piston (4) and positioned within an intermediate section (61) of the actuating element (53) situated axially between the two actuating contours (22, 23), the latching mechanism (50) releasable in the intermediate position, wherein a force directed towards the second position of the armature rod (20) acts upon the actuating element (53) in the first position of the armature rod (20), a force directed towards the first position of the armature rod (20) acts upon the actuating element (53) in the second position of the armature rod (20), and the armature rod (20) is in a force-compensated condition in the intermediate position of the armature rod (20), wherein components of the device (2; 204) are coordinated with regard to geometry and with regard to forces acting upon the components of the device (2; 204) such that the permanent magnet (62) holds the armature rod (20) in the first position when the electromagnet (19) is in the non-energized condition of the electromagnet (19) and the parking lock (3) is in the engaged condition of the parking lock (3), the electromagnet (19) holds the armature rod (20) in the second position when the electromagnet (19) is in the energized condition of the electromagnet (19) and the parking lock (3) is in the disengaged condition of the parking lock (3), the parking lock (3) is disengageable in a pressurized condition of the piston (4) and in the energized condition of the electromagnet (19), and the parking lock (3) is engageable in a non-pressurized condition of the piston (4) and in the non-energized condition of the electromagnet (19).

2. The device of claim 1, wherein the components of the device (2; 204) are coordinated with regard to the geometry and with regard to the forces acting upon the components of the device (2; 204) such that the permanent magnet (62) holds the armature rod (20) in the first position when the electromagnet (19) is in the non-energized condition of the electromagnet (19), the parking lock (3) is in the engaged condition of the parking lock (3), and the piston (3) is in either the pressurized condition or the non-pressurized condition of the piston (4).

3. The device of claim 1, wherein the components of the device (2; 204) are coordinated with regard to the geometry and with regard to the forces acting upon the components of the device (2; 204) such that the electromagnet (19) holds the armature rod (20) in the second position when the electromagnet (19) is in the energized condition of the electromagnet (19), the parking lock (3) is in the disengaged condition of the parking lock (3), and the piston (3) is in the non-pressurized condition of the piston (4).

4. The device of claim 1, wherein the latching mechanism (50) is centrally arranged within the piston (4).

5. The device of claim 1, wherein the components of the device (2; 204) are coordinated with regard to the geometry and with regard to the forces acting upon the components of the device (2; 204) such that:

the armature rod (20) is transferable out of the first position into the intermediate position when the piston (3) is in the pressurized condition of the piston (4) and the electromagnet (19) is in the energized condition of the electromagnet (19);

when the latching mechanism (50) is released, the piston rod (7) is transferable by pressure applied at the piston (4) in the direction of an end position of the piston (4) associated with the disengaged condition of the parking lock (3);

when the latching mechanism (50) is released, the armature rod (20) is transferable into the second position by the energized electromagnet (19); and the parking lock (3) transitions out of the engaged condition into the disengaged condition when the armature rod (20) is transferred into the second position by the energized electromagnet (19).

6. The device of claim 1, wherein the components of the device (2; 204) are coordinated with regard to the geometry and with regard to the forces acting upon the components of the device (2; 204) such that:

when the parking lock (3) is in the disengaged condition of the parking lock (3), the piston (4) is in the non-pressurized condition of the piston (4), and the electromagnet (19) is in the non-energized condition of the electromagnet (19), the armature rod (20) is transferable into the intermediate position due to a preload force applied at the actuating element (53) in the second position of the armature rod (20) such that the latching mechanism (50) transitions into the released condition;

the piston rod (7) is transferable into a position associated with the engaged condition of the parking lock (3) due to a spring force of a spring unit (5) such that the armature rod (20) transitions from the intermediate position into the first position, in which the permanent magnet (62) holds the armature rod (20).

7. The device of claim 1, wherein the grooves (45, 46) of the piston (4) are configured as radial inner grooves.

8. The device of claim 1, wherein the latching mechanism (50) is configured as a ball stop, and the ball stop comprises a plurality of balls as the interlocking elements (51).

9. The device of claim 8, wherein:

the ball stop (50) is centrally arranged within the piston (4);

the balls (51) of the ball stop (50) are accommodated in an axially fixed manner in the housing-affixed component (30);

the housing-affixed component (30) is configured as a sleeve; and the balls (51) of the ball stop (50) are radially displaceable with respect to the sleeve (30) and are selectively engageable with the piston (4) by way of rolling at the actuating contours (22, 23).

10. The device of claim 1, wherein:

the interlocking elements are configured as spring arms;
first ends of the spring arms are fixed on the housing side;
second ends of the spring arms are each swivelable relative to a respective first end by way of the actuating contours and, as a result, are selectively engageable with the piston in a form-locking manner.

11. The device of claim 1, further comprising: a controller configured for operating the electromagnet (19); and for determining a time profile of a control signal output by the controller at the electromagnet (19), for determining a particular currently present axial position of the armature rod (20) based on the time profile, and for determining an operating condition of the latching mechanism (50) in each case based on the particular currently present axial position of the armature rod (20).

* * * * *